(12) United States Patent
Kuroha et al.

(10) Patent No.: US 7,625,653 B2
(45) Date of Patent: Dec. 1, 2009

(54) IONIC CONDUCTOR

(75) Inventors: Tomohiro Kuroha, Osaka (JP); Noboru Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 296 days.

(21) Appl. No.: 11/884,388

(22) PCT Filed: Mar. 13, 2006

(86) PCT No.: PCT/JP2006/004900

§ 371 (c)(1),
(2), (4) Date: Aug. 15, 2007

(87) PCT Pub. No.: WO2006/098272

PCT Pub. Date: Sep. 21, 2006

(65) Prior Publication Data

US 2009/0023037 A1    Jan. 22, 2009

(30) Foreign Application Priority Data

Mar. 15, 2005  (JP) .............................. 2005-072524

(51) Int. Cl.
| | |
|---|---|
| H01M 8/02 | (2006.01) |
| H01M 8/12 | (2006.01) |
| H01B 1/08 | (2006.01) |
| H01B 1/06 | (2006.01) |
| G01N 27/406 | (2006.01) |
| G01N 27/416 | (2006.01) |
| C04B 35/495 | (2006.01) |

(52) U.S. Cl. ..................... 429/33; 423/592.1; 501/96.3; 501/103; 501/104; 501/152

(58) Field of Classification Search .................... 429/33; 423/529.1; 501/96.3, 103, 104, 152
See application file for complete search history.

(56) References Cited

U.S. PATENT DOCUMENTS

| | | | | |
|---|---|---|---|---|
| 5,314,508 | A | * | 5/1994 | Taniguchi et al. .......... 29/623.5 |
| 5,387,330 | A | * | 2/1995 | Taniguchi et al. ........... 204/421 |
| 5,387,550 | A | * | 2/1995 | Cheffings et al. ........... 438/643 |
| 5,632,874 | A | * | 5/1997 | Christiansen ............... 204/419 |
| 5,844,225 | A | * | 12/1998 | Kimock et al. ......... 235/462.01 |

(Continued)

FOREIGN PATENT DOCUMENTS

JP    62-226851    * 10/1987

(Continued)

OTHER PUBLICATIONS

Machine translation of Tagiguchi (JP2001-307546).*

*Primary Examiner*—Melvin C Mayes
*Assistant Examiner*—Jun Li
(74) *Attorney, Agent, or Firm*—McDermott Will & Emery LLP

(57) ABSTRACT

A material which conducts protons or oxide ions with high ionic conductivity and is excellent in moisture resistance and reduction resistance is provided. A perovskite oxide represented by the formula (1):

$$BaZr_aCe_bM^1_cL^1_dO_{3-\alpha} \qquad (1)$$

(wherein $M^1$ is at least one member selected from the group consisting of rare earth elements, In, Mn, Fe, Co, Ni, Al and Ga, $L^1$ is at least one member selected from the group consisting of P, B and N and a, b, c, d and $\alpha$ satisfy $0 \leq a < 1.2$, $0 < b < 1.2$, $0 < c < 1.2$, $0.9 < a+b+c < 1.2$, $0 < d < 0.1$ and $0 < \alpha < 3$) is used as an ionic conductor.

8 Claims, 3 Drawing Sheets

U.S. PATENT DOCUMENTS

| | | | |
|---|---|---|---|
| 5,860,359 A * | 1/1999 | Taniguchi et al. | 99/451 |
| 6,517,693 B2 * | 2/2003 | Taniguchi | 204/421 |
| 6,528,195 B1 * | 3/2003 | Taniguchi | 429/33 |
| 6,613,300 B2 * | 9/2003 | Mangold et al. | 423/278 |
| 6,723,674 B2 * | 4/2004 | Wang et al. | 501/152 |
| 7,141,327 B2 * | 11/2006 | Taniguchi | 429/30 |
| 7,235,171 B2 * | 6/2007 | Taniguchi | 205/787 |
| 7,419,736 B2 * | 9/2008 | Taniguchi | 429/33 |
| 2001/0018989 A1 | 9/2001 | Taniguchi | |
| 2003/0008764 A1 * | 1/2003 | Wang et al. | 501/152 |
| 2003/0148163 A1 * | 8/2003 | Fleck et al. | 429/33 |
| 2004/0237713 A1 * | 12/2004 | Breslin et al. | 75/235 |
| 2005/0153187 A1 * | 7/2005 | Chiba et al. | 429/30 |

FOREIGN PATENT DOCUMENTS

| | | |
|---|---|---|
| JP | 63260107 A * | 10/1988 |
| JP | 3-176700 | 7/1991 |
| JP | 05217793 A * | 8/1993 |
| JP | 6-186193 | 7/1994 |
| JP | 6-231611 | 8/1994 |
| JP | 8-327592 | 12/1996 |
| JP | 2000-302550 | 10/2000 |
| JP | 2001-307546 | 11/2001 |
| JP | 2005-100978 | 4/2005 |
| JP | 2005-243473 | 9/2005 |
| JP | 2005-336022 | 12/2005 |
| JP | 2006-054170 | 2/2006 |
| JP | 2006-059610 | 3/2006 |
| JP | 2006-059611 | 3/2006 |
| WO | WO 2005/024850 A1 | 3/2005 |

* cited by examiner

IONIC CONDUCTOR

RELATED APPLICATIONS

This application is the U.S. National Phase under 35 U.S.C. § of International Application No. PCT/JP2006/304900, filed on Mar. 13, 2006, which in turn claims the benefit of Japanese Application No. 2005-072524, filed on Mar. 15, 2005, the disclosures of which Applications are incorporated by reference herein.

TECHNICAL FIELD

The present invention relates to an ionic conductor suitable for an electrochemical device such as a fuel cell or a sensor.

BACKGROUND ART

Ionic conductors have a long history and so far various types of ionic conductors have been developed. Specifically, for example, zirconium oxide or cerium oxide which is an oxide ion conductor has been used as an ionic conductor for fuel cells and gas sensors.

As for proton conductors, $SrCe_{1-x}M_xO_3$, $CaZr_{1-x}M_xO_3$ and $SrZr_{1-x}M_xO_3$ (M is a trivalent element) have been reported.

In addition, $BaCe_{1-x}M_xO_3$ (M is a trivalent element), which is an oxide of barium and cerium, has been reported as an ionic conductor which conducts oxide ions and protons simultaneously. In particular, when Gd is used as M and x is adjusted to 0.16 to 0.23, high conductivity can be obtained (e.g., Patent Document 1).

Although many other ionic conductors have been found, few of them satisfy both electric conductance and reliability and have been put into practical use. At present, only zirconia is used for oxygen sensors and $SrCe_{1-x}M_xO_3$ and $CaZr_{1-x}M_xO_3$ are used to detect the hydrogen concentration in a melting furnace.

However, $SrCe_{1-x}M_xO_3$ and $CaZr_{1-x}M_xO_3$, in particular, work in limited environment and are not sufficiently reliable. For example, when these materials are boiled in water, they are decomposed in about 1 to 100 hours. Further, change which seems to be attributable to decomposition of the above materials is observed at 85° C. and 85% RH.

Moreover, a mixed ionic conductor $BaCe_{1-x}M_xO_3$ also dissolves in boiling water or is deteriorated in high humidity. At present, proton conductors which are composed of a perovskite oxide and stable in high humidity hardly exist.

Further, Patent Document 2 proposes $BaZr_{1-x-y}Ce_xM_yO_3$, which is a perovskite oxide usable as an ionic conductor in view of stability in boiling water. However, $BaZr_{1-x-y}Ce_xM_yO_3$ has low ion conductivity compared to $BaCe_{1-x}M_xO_3$ (M is a trivalent element).

In addition, since an ionic conductor of solid oxide is usually used at high temperatures, such a conductor is required to be resistant to thermal shock. Further, since such a proton conductor is often used in reducing atmosphere, it is also required to have reduction resistance.

As described above, to provide a highly reliable device, ionic conductors must have high ion conductivity and stability. However, although current ionic conductors composed of perovskite oxide have high ion conductivity, they have poor stability including moisture resistance, reduction resistance and thermal shock resistance. In particular, indium oxide has poor stability as they tend to be reduced in reducing atmosphere at high temperatures.

Patent Document 1: JP 03-176700 A
Patent Document 2: JP 2000-302550 A

DISCLOSURE OF THE INVENTION

Problem to be Solved by the Invention

As described above, highly reliable ionic conductors, in particular, proton conductors of perovskite oxide are rare. Further, perovskite oxides which have been conventionally proposed are unstable in high humidity atmosphere or upon thermal shock depending on different sintering properties.

In short, a problem with ionic conductors is to manufacture a novel, highly reliable ionic conductor material, to increase reliability of conventional materials and, in particular, to reduce decomposability in high humidity atmosphere or reducing atmosphere. The present invention solves the above problem and aims at providing an ionic conductor excellent in moisture resistance and reduction resistance.

Means for Solving the Problem

To solve the above problem, the present invention provides:

an ionic conductor comprising a perovskite oxide represented by the formula (1):

$$BaZr_aCe_bM^1_cL^1_dO_{3-\alpha} \qquad (1)$$

(wherein $M^1$ is at least one element selected from the group consisting of rare earth elements, In, Mn, Fe, Co, Ni, Al and Ga, $L^1$ is at least one element selected from the group consisting of P, B and N and a, b, c, d and α satisfy $0 \leq a < 1.2$, $0 < b < 1.2$, $0 < c < 1.2$, $0.9 < a+b+c < 1.2$, $0 < d < 0.1$ and $0 < \alpha < 3$).

In particular, preferably a=0 is satisfied and $M^1$ is In in the above formula (1).

In that case, the perovskite oxide can be represented by the formula (2):

$$BaCe_xM^2_yL^2_zO_{3-\alpha} \qquad (2)$$

(wherein $M^2$ is at least one element selected from the group consisting of rare earth elements, In, Mn, Fe, Co, Ni, Al and Ga, $L^2$ is at least one element selected from the group consisting of P, B and N and x, y, z and α satisfy $0 < x < 1.2$, $0 < y < 1.2$, $0.9 < x+y < 1.2$, $0 < z < 0.1$ and $0 < \alpha < 3$).

In particular, preferably a=0 is satisfied and $M^1$ is In in the above formula (1).

In that case, the perovskite oxide can be represented by the formula (3):

$$BaCe_eIn_fL^3_gO_{3-\alpha} \qquad (3)$$

(wherein $L^3$ is at least one element selected from the group consisting of P, B and N and e, f, g and α satisfy $0 < e < 1.2$, $0 < f < 1.2$, $0.9 < e+f < 1.2$, $0 < g < 0.1$ and $0 < \alpha < 3$).

The ionic conductor of the present invention having a construction as described above has conductivity necessary for electrochemical devices such as fuel cells and also excellent moisture resistance.

The rare earth element as used herein means Sc, Y and lanthanoids (atomic number 57La to atom number 71Lu). In the above formulas (1) to (3), α is nonstoichiometric and determined from the amount of oxygen vacancies.

The present invention also provides an electrochemical device comprising the ionic conductor as a solid electrolyte. The electrochemical devices include, for example, fuel cells and gas sensors.

Since the electrochemical device of the present invention comprises the ionic conductor of the present invention as a solid electrolyte, the device can have high moisture resistance, high performance and long life.

The composition (i.e., the composition after sintering) of the perovskite oxide as described above which is the ionic conductor of the present invention can be determined by ICP spectrometry using CIROS-120 made by Rigaku Corporation. In ICP spectrometry, a sample dissolved in acid or base is introduced into argon plasma at high temperatures. Then, an emission spectrum emitted when atoms or ions in an excited state return to the ground state is analyzed, elements are identified by the emission wavelength of the spectrum, and the elements are determined from the emission intensity.

EFFECT OF THE INVENTION

According to the present invention, a highly reliable ionic conductor excellent in stability such as moisture resistance and reduction resistance can be obtained.

BEST MODE FOR CARRYING OUT THE INVENTION

Figure 1:
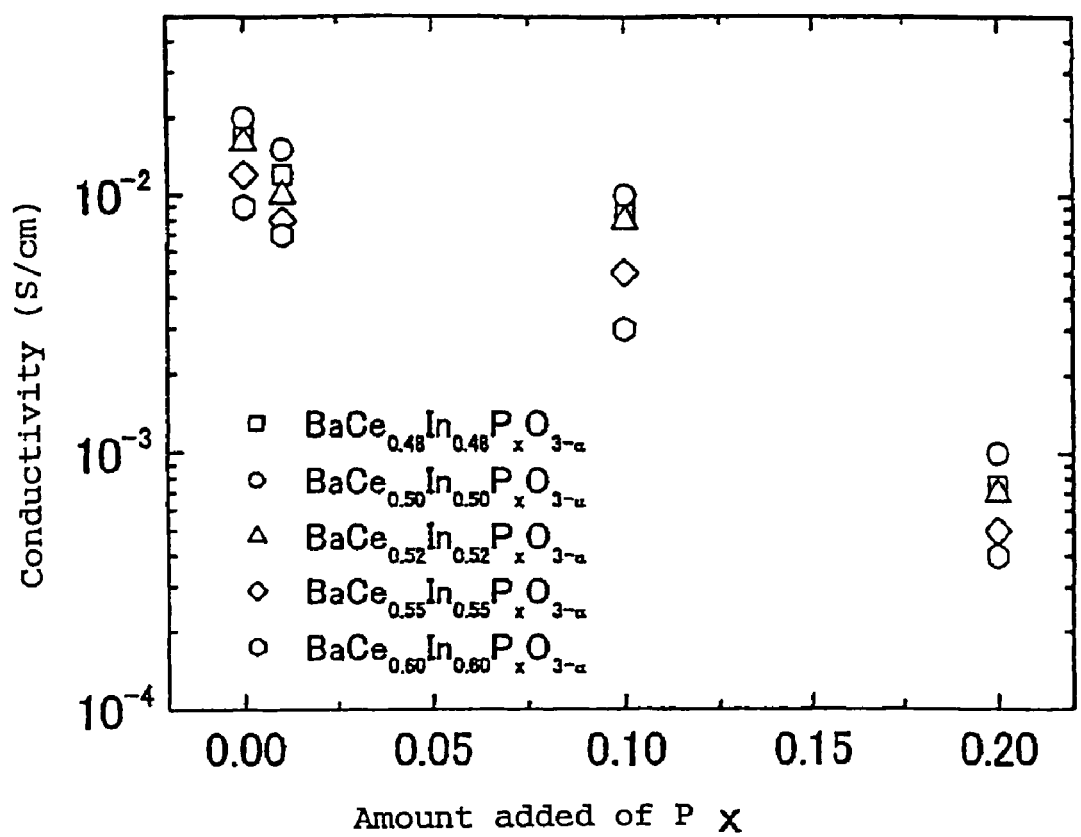
FIG. 1 illustrates a correlation between relative amounts of P added to typical ionic conductors and conductivity in the present examples.

The present invention relates to an ionic conductor comprising a perovskite oxide represented by the formula (1):

$$BaZr_aCe_bM^1_cL^1_dO_{3-\alpha} \quad (1)$$

(wherein $M^1$ is at least one element selected from the group consisting of rare earth elements, In, Mn, Fe, Co, Ni, Al and Ga, $L^1$ is at least one element selected from the group consisting of P, B and N and a, b, c, d and $\alpha$ satisfy $0 \leq a<1.2$, $0<b<1.2$, $0<c<1.2$, $0.9<a+b+c<1.2$, $0<d<0.1$ and $0<\alpha<3$), and an electrochemical device using the same.

In the following, preferred embodiments of the ionic conductor and the electrochemical device of the present invention are described.

Embodiment 1

The ionic conductor according to Embodiment 1 of the present invention comprises a perovskite oxide represented by the formula (2):

$$BaCe_xM^2_yL^2_zO_{3-\alpha} \quad (2)$$

(wherein $M^2$ is at least one element selected from the group consisting of rare earth elements, In, Mn, Fe, Co, Ni, Al and Ga, $L^2$ is at least one element selected from the group consisting of P, B and N and x, y, z and $\alpha$ satisfy $0<x<1.2$, $0<y<1.2$, $0.9<x+y<1.2$, $0<z<0.1$ and $0<\alpha<3$).

In other words, the perovskite oxide according to this embodiment satisfies a=0 in the above formula (1) and comprises Ba and Ce as basic components.

Accordingly, $M^2$, $L^2$, x, y and z in the formula (2) each corresponds to $M^1$, $L^1$, b, c and d in the formula (1).

In the above formula (2), the above $M^2$ is an element which substitutes part of cerium and produces high ionic conductivity. Preferably, such $M^2$ is at least one member selected from the group consisting of rare earth elements, In, Mn, Fe, Co, Ni, Al and Ga.

The above $L^2$ is an element which has an action to reduce excess vacancies in crystal lattices and has an effect of improving moisture resistance and reduction resistance. Preferably, such $L^2$ is at least one member selected from the group consisting of P, B and N.

In the above formula (2), x, y, z and $\alpha$ satisfy $0<x<1.2$, $0<y<1.2$, $0.9<x+y<1.2$ and $0<z<0.1$. $\alpha$ is determined from the ratio of elements and has any value in the range of $0<\alpha<3$.

When x is 0, i.e., the content of Ce based on Ba is 0, the perovskite oxide represented by the formula (2) is an oxide containing Ba and $M^2$, and proton conductivity produced by cerium is lost.

On the other hand, when x is 1.2 or more, i.e., the content of Ce based on Ba is 1.2 or more, the ratio of Ce to Ba is largely shifted from 1:1 which is the stoichiometric ratio of Ce to Ba. As a result, synthesis of a compound containing a more stable monolayer is difficult. Accordingly, the range of x is preferably $0<x<1.2$.

When y is 0, i.e., the content of $M^2$ based on Ba is 0, the perovskite oxide represented by the above formula (2) is an oxide containing Ba and Ce and has decreased conductivity.

On the other hand, when y is 1.2 or more, i.e., the content of $M^2$ based on Ba is 1.2 or more, the ratio of $M^2$ to Ba is largely shifted from 1:1 which is the stoichiometric ratio of $M^2$ to Ba. As a result, synthesis of a compound containing a more stable monolayer is difficult. Accordingly, the range of y is preferably $0<y<1.2$.

When x+y is 0.9 or less, i.e., the content of (Ce+$M^2$) based on Ba is 0.9 or less, the ratio of (Ce+$M^2$) to Ba is largely shifted from 1:1 which is the stoichiometric ratio of (Ce+$M^2$) to Ba. This means that excess Ba is present in the ionic conductor. When excess Ba is present, redundant Ba precipitates at grain boundaries and reacts with water in the air to produce barium hydroxide. Barium hydroxide then reacts with carbon dioxide and barium carbonate precipitates. Such precipitation of barium carbonate is one of the causes of deterioration of the ionic conductor.

On the other hand, when x+y is 1.2 or more, i.e., the content of (Ce+$M^2$) based on Ba is 1.2 or more, the ratio of (Ce+$M^2$) to Ba is shifted from 1:1 which is the stoichiometric ratio of (Ce+$M^2$) to Ba. This means that excess (Ce+$M^2$) is present in the ionic conductor and synthesis of a compound containing a more stable monolayer is difficult. Accordingly, preferably $0.9<x+y<1.2$.

When z is 0, i.e., the content of $L^2$ based on Ba is 0, the perovskite oxide represented by the formula (2) is an oxide containing Ba and (Ce+$M^2$) and is decomposed in high humidity or reducing atmosphere.

On the other hand, when z is 0.1 or more, i.e., the content of $L^2$ based on Ba is 0.1 or more, not only $L^2$ excessively added immobilizes redundant Ba, but also spaces in crystal lattices are filled up with $L^2$, resulting in remarkable decrease in conductivity. Accordingly, preferably $0<z<0.1$.

As described above, $\alpha$ is calculated from x, y and the valence of $M^2$ and has any value in the range of $0<\alpha<3$ depending on the amount of oxygen vacancies.

Preferably, $M^2$ is at least one element selected from the group consisting of Pr, Y, Yb, Gd and In. These elements have an ionic radius equivalent to that of cerium, but have an ion valence smaller than the ion valence of cerium. Accordingly, oxygen vacancies can be formed without significant change in the crystal structure of the ionic conductor.

Further, $L^2$ is preferably P because P forms a more stable compound with Ba and thus has a greater effect of immobilizing excess Ba compared to B or N.

Embodiment 2

The ionic conductor according to Embodiment 2 of the present invention comprises a perovskite oxide represented by the formula (1):

$$BaZr_aCe_bM^1_cL^1_dO_{3-\alpha} \quad (1)$$

(wherein $M^1$ is at least one element selected from the group consisting of rare earth elements, In, Mn, Fe, Co, Ni, Al and Ga, $L^1$ is at least one element selected from the group consisting of P, B and N and a, b, c, d and $\alpha$ satisfy $0 \leq a < 1.2$, $0 < b < 1.2$, $0 < c < 1.2$, $0.9 < a+b+c < 1.2$, $0 < d < 0.1$ and $0 < \alpha < 3$).

In other words, the perovskite oxide according to this embodiment comprises Ba, Zr and Ce as basic components.

In the above formula (1), $M^1$ is an element which substitutes part of cerium and produces high ionic conductivity. Preferably, such $M^1$ is at least one member selected from the group consisting of rare earth elements, In, Mn, Fe, Co, Ni, Al and Ga.

The above $L^1$ is an element which has an action to reduce excess vacancies in crystal lattices and has an effect of improving moisture resistance and reduction resistance. Preferably, such $L^1$ is at least one member selected from the group consisting of P, B and N.

In the above formula (1), a, b, c, d and $\alpha$ satisfy $0 \leq a < 1.2$, $0 < b < 1.2$, $0 < c < 1.2$ and $0.9 < a+b+c < 1.2$. $\alpha$ is determined from the ratio of elements and has any value in the range of $0 < \alpha < 3$.

While a, which is the content of Zr based on Ba, may be 0, preferably $a > 0$ for more effective use of chemical and physical stability produced by zirconium.

On the other hand, when a is 1.2 or more, i.e., the content of Zr based on Ba is 1.2 or more, the ratio of Zr to Ba is largely shifted from 1:1 which is the stoichiometric ratio of Zr to Ba. As a result, synthesis of a compound containing a more stable monolayer is difficult. In addition, a higher relative ratio of zirconium also causes decrease in proton conductivity. Accordingly, the range of a is preferably $0 < a < 1.2$.

When b is 0, i.e., the content of Ce based on Ba is 0, the perovskite oxide represented by the formula (1) is an oxide containing Ba, Zr and $M^1$, and proton conductivity produced by cerium is lost.

On the other hand, when b is 1.2 or more, i.e., the content of Ce based on Ba is 1.2 or more, the ratio of Ce to Ba is largely shifted from 1:1 which is the stoichiometric ratio of Ce to Ba. As a result, synthesis of a compound containing a more stable monolayer is difficult. Accordingly, the range of b is preferably $0 < b < 1.2$.

When c is 0, i.e., the content of $M^1$ based on Ba is 0, the perovskite oxide represented by the formula (1) is an oxide containing Ba, Zr and Ce and has decreased conductivity.

On the other hand, when c is 1.2 or more, i.e., the content of $M^1$ based on Ba is 1.2 or more, the ratio of $M^1$ to Ba is largely shifted from 1:1 which is the stoichiometric ratio of $M^1$ to Ba. As a result, synthesis of a compound containing a more stable monolayer is difficult. Accordingly, the range of c is preferably $0 < c < 1.2$.

When a+b+c is 0.9 or less, i.e., the content of $(Zr+Ce+M^1)$ based on Ba is 0.9 or less, the ratio of $(Zr+Ce+M^1)$ to Ba is shifted from 1:1 which is the stoichiometric ratio of $(Zr+Ce+M^1)$ to Ba. This means that excess Ba is present in the ionic conductor. When excess Ba is present, redundant Ba precipitates at grain boundaries and reacts with water in the air to produce barium hydroxide. Barium hydroxide then reacts with carbon dioxide and barium carbonate precipitates. Such precipitation of barium carbonate is one of the causes of deterioration of the ionic conductor.

On the other hand, when a+b+c is 1.2 or more, i.e., the content of $(Zr+Ce+M^1)$ based on Ba is 1.2 or more, the ratio of $(Zr+Ce+M^1)$ to Ba is shifted from 1:1 which is the stoichiometric ratio of $(Zr+Ce+M^1)$ to Ba. This means that excess $(Zr+Ce+M^1)$ is present in the ionic conductor and synthesis of a compound containing a more stable monolayer is difficult. Accordingly, preferably $0.9 < a+b+c < 1.2$.

When d is 0, i.e., the content of $L^1$ based on Ba is 0, the perovskite oxide represented by the formula (1) is an oxide containing Ba and $(Zr+Ce+M^1)$ and is decomposed in high humidity or reducing atmosphere.

On the other hand, when d is 0.1 or more, i.e., the content of $L^1$ based on Ba is 0.1 or more, not only $L^1$ excessively added immobilizes redundant Ba, but also spaces in crystal lattices are filled up with $L^1$, resulting in remarkable decrease in conductivity. Accordingly, preferably $0 < d < 0.1$.

As described above, $\alpha$ is calculated from a, b, c, d and the valence of $M^1$ and has any value in the range of $0 < \alpha < 3$ depending on the amount of oxygen vacancies.

Preferably, $M^1$ is at least one element selected from the group consisting of Pr, Y, Yb, Gd and In. These elements have an ionic radius equivalent to that of cerium, but have an ion valence smaller than the ion valence of cerium. Accordingly, oxygen vacancies can be formed without significant change in the crystal structure of the ionic conductor.

Further, $L^1$ is preferably P because P forms a more stable compound with Ba and thus has a greater effect of immobilizing excess Ba compared to B or N.

Embodiment 3

The ionic conductor according to Embodiment 3 of the present invention comprises a perovskite oxide represented by the formula (3):

$$BaCe_eIn_fL^3_gO_{3-\alpha} \quad (3)$$

(wherein $L^3$ is at least one element selected from the group consisting of P, B and N and e, f, g and a satisfy $0 < e < 1.2$, $0 < f < 1.2$, $0.9 < e+f < 1.2$, $0 < g < 0.1$ and $0 < \alpha < 3$).

In other words, the perovskite oxide according to this embodiment is a perovskite oxide in which a=0 is satisfied and $M^1$ is In in the above formula (1), comprising Ba, Ce and In as basic components.

Accordingly, $L^3$, e, f and g in the formula (3) each corresponds to $L^1$, b, c and d in the formula (1).

In the above formula (3), the above $L^3$ is an element which has an action to reduce excess vacancies in crystal lattices and has an effect of improving moisture resistance and reduction resistance. Preferably, such $L^3$ is at least one member selected from the group consisting of P, B and N.

In the above formula (3), e, f, g and a satisfy $0 < e < 1.2$, $0 < f < 1.2$, $0.9 < e+f < 1.2$ and $0 < g < 0.1$. $\alpha$ is determined from the ratio of elements and has any value in the range of $0 < \alpha < 3$.

When e is 0, i.e., the content of Ce based on Ba is 0, the perovskite oxide represented by the formula (3) is an oxide containing Ba and In, and proton conductivity produced by cerium is lost.

On the other hand, when e is 1.2 or more, i.e., the content of Ce based on Ba is 1.2 or more, the ratio of Ce to Ba is largely shifted from 1:1 which is the stoichiometric ratio of Ce to Ba.

As a result, synthesis of a compound containing a more stable monolayer is difficult. Accordingly, the range of e is preferably $0 < e < 1.2$.

When f is 0, i.e., the content of In based on Ba is 0, the perovskite oxide represented by the above formula (3) is an oxide containing Ba and Ce alone and has decreased conductivity.

On the other hand, when f is 1.2 or more, i.e., the content of In based on Ba is 1.2 or more, the ratio of In to Ba is largely shifted from 1:1 which is the stoichiometric ratio of In to Ba. As a result, synthesis of a compound containing a more stable monolayer is difficult. Accordingly, the range of f is preferably $0 < f < 1.2$.

When e+f is 0.9 or less, i.e., the content of (Ce+In) based on Ba is 0.9 or less, the ratio of (Ce+In) to Ba is largely shifted from 1:1 which is the stoichiometric ratio of (Ce+In) to Ba. This means that excess Ba is present in the ionic conductor. When excess Ba is present, redundant Ba precipitates at grain boundaries and reacts with water in the air to produce barium hydroxide. Barium hydroxide then reacts with carbon dioxide and barium carbonate precipitates. Such precipitation of barium carbonate is one of the causes of deterioration of the ionic conductor.

On the other hand, when e+f is 1.2 or more, i.e., the content of (Ce+In) based on Ba is 1.2 or more, the ratio of (Ce+In) to Ba is shifted from 1:1 which is the stoichiometric ratio of (Ce+In) to Ba. This means that excess (Ce+In) is present in the ionic conductor and synthesis of a compound containing a more stable monolayer is difficult. Accordingly, preferably $0.9 < e+f < 1.2$.

When g is 0, i.e., the content of $L^3$ based on Ba is 0, the perovskite oxide represented by the formula (3) is an oxide containing Ba and (Ce+In) and is decomposed in high humidity or reducing atmosphere.

On the other hand, when g is 0.1 or more, i.e., the content of $L^3$ based on Ba is 0.1 or more, not only $L^3$ excessively added immobilizes redundant Ba, but also spaces in crystal lattice are filled up with $L^3$, resulting in remarkable decrease in conductivity. Accordingly, preferably $0 < g < 0.1$.

As described above, α is calculated from e and f and has any value in the range of $0 < \alpha < 3$ depending on the amount of oxygen vacancies.

Further, particularly preferably $1 < e+f < 1.2$. This is because when the ratio of (Ce+In) to Ba is 1 or more, excess Ba can be surely prevented.

$L^3$ is particularly preferably P because P forms a more stable compound with Ba and thus has a greater effect of immobilizing excess Ba compared to B or N.

Embodiment 4

Figure 2:
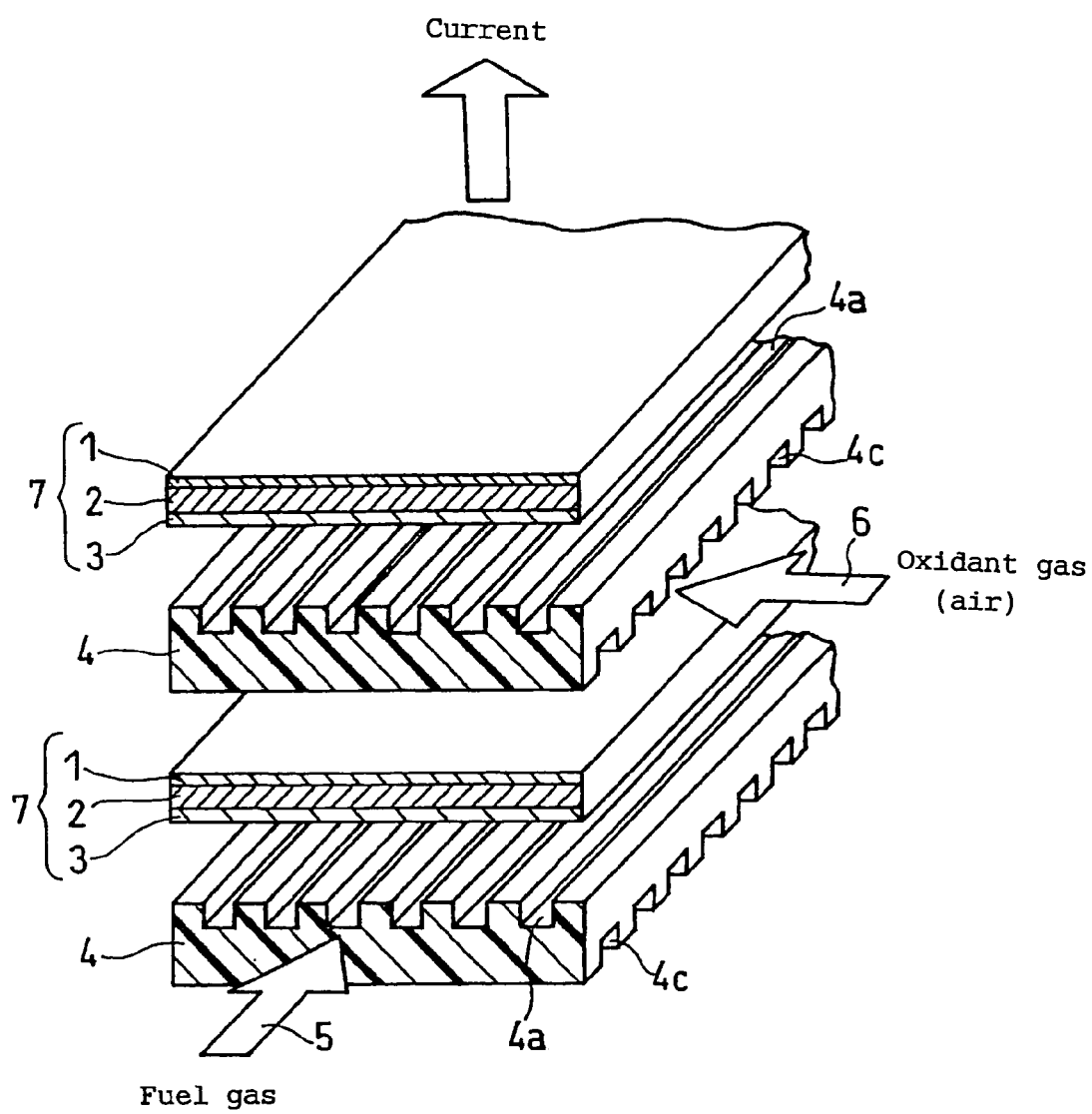
FIG. 2 is a schematic exploded perspective view illustrating main parts of a fuel cell which is an example of the electrochemical device of the present invention.

Preferred embodiments of the electrochemical device of the present invention using the ionic conductor of the present invention are described. FIG. 2 is a schematic exploded perspective view illustrating main parts of a fuel cell which is an example of the electrochemical device of the present invention.

First, the structure of a fuel cell shown in FIG. 2 is described. The fuel cell shown in FIG. 2 is a flat plate fuel cell, and has a layered unit 7 comprising a cathode (air electrode) 1, the ionic conductor 2 of the present invention and an anode (fuel electrode) 3 and a separator 4 interposed between layered units 7. Although two layered units 7 and two separators 4 are described in FIG. 2, the structure is not limited thereto. The structure can be accordingly selected depending on the specification of desired fuel cells.

A cathode composed of a conventionally known material can be used as the cathode 1. Examples of such materials include perovskite oxide such as $LaCrO_3$, $LaCoO_3$, $LaMnO_3$ or $LaFeO_3$ and lanthanum manganate ($LaMnO_3$) oxide such as $LaSrMnO_3$. In these materials, Sr or Ca may be doped into La sites. A composite material containing plural kinds of the above materials may also be used. Preferably, the cathode 1 is porous.

On the other hand, an anode also composed of a conventionally known material can be used as the anode 3. Examples of such materials include Ni, Pt, cermet containing Ni and yttria stabilized zirconia (YSZ) and a mixture of nickel oxide and other metal oxide, such as NiO—YSZ.

Preferably, the anode 3 is porous as well.

Further, the separator 4 may be composed of a conventionally known material. The separator 4 may be composed of, for example, lanthanum chromite or lanthanum strontium chromite.

An oxidant gas channel 4c for supplying oxidant gas (e.g., air) to the cathode 1 in the layered unit 7 is provided on one side of the separator 4. A fuel gas channel 4a for supplying fuel gas (e.g., reducing gas such as hydrogen or natural gas) to the anode 3 in the layered unit 7 is provided on the other side.

While the oxidant gas channel 4c and the fuel gas channel 4a each consists of a plurality of straight and parallel grooves in FIG. 2, the present invention is not limited thereto and the design can be accordingly changed.

The manner of operation of the fuel cell is briefly described.

When generating electricity in the fuel cell, oxidant gas 6 is supplied to the cathode 1 and fuel gas 5 is supplied to the anode 3. Electrons produced by oxidation-reduction reaction in each electrode (cathode 1 and anode 3) are delivered to the outside as current.

Herein, since the ionic conductor 2 of the present invention is an electrolyte through which protons are mainly conducted, produced water is discharged through the cathode 1, not the anode 3. While produced water must be discharged upon generation of electricity in fuel cells, produced water is easily discharged by increasing the flow rate of oxidant gas when such water is discharged through the cathode 1.

However, when using yttria-stabilized zirconia which is a conventional material conducting oxide ions alone instead of the ionic conductor 2 of the present invention, produced water is discharged through the anode 3, and so the water must be discharged utilizing flow of fuel gas. In such cases, if discharge of produced water is facilitated by increasing the flow rate of fuel gas, the fuel gas is wasted, resulting in decrease in substantial fuel utilization efficiency. Fuel cells using the ionic conductor 2 of the present invention have a great advantage in this regard as well over fuel cells using a conventional electrolyte in which oxide ions are a conducting material.

Although a flat plate fuel cell has been described in this embodiment, the fuel cell of the present invention may also be cylindrical. In such cases, a cylindrical fuel cell can be prepared by a known method except for using the ionic conductor of the present invention.

Embodiment 5

Figure 3:
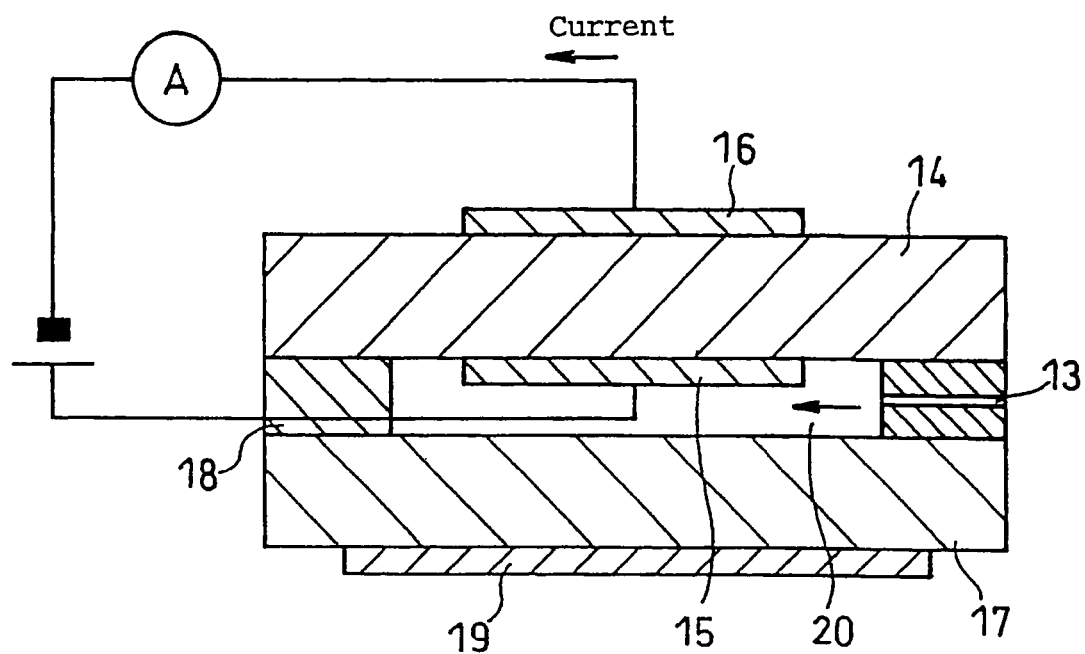
FIG. 3 is a schematic cross-sectional view illustrating a structure of a gas sensor (hydrocarbon sensor) which is an example of the electrochemical device of the present invention.

Another preferred embodiment of the electrochemical device of the present invention using the ionic conductor of the present invention is described. FIG. 3 is a schematic cross-sectional view illustrating a structure of a gas sensor (hydrocarbon sensor) which is an example of the electrochemical device of the present invention.

First, the structure of the gas sensor shown in FIG. 3 is described. The gas sensor shown in FIG. 3 has a layered body comprising a positive electrode 15, a negative electrode 16 and the ionic conductor 14 of the present invention interposed between the positive electrode 15 and the negative electrode 16.

The gas sensor shown in FIG. 3 comprises a substrate 17 (e.g., a ceramic substrate) on which the layered body is fixed and held, an inorganic adhesive layer 18 which adheres the layered body and the substrate 17 with a space 20 between the layered body and the substrate 17 and a heater 19 provided on the outer surface of the substrate 17.

Further, a diffusion control hole 13 in glass is provided between the layered body and the substrate 17. The space 20 between the layered body and the substrate 17 is communicated with outside through the diffusion control hole 13. The positive electrode 15 and the negative electrode 16 are made of, for example, Pt and the inorganic adhesive layer 18 is made of, for example, a glass composition. Further, the heater 19 is composed of, for example, a ceramic member and Pt wire.

The operation of the gas sensor is now described. In the gas sensor, when a predetermined voltage (e.g., 1.2 V) is applied and kept between the positive electrode 15 and the negative electrode 16, current flows in proportion to the concentration of hydrocarbon present in the space 20 adjacent to the positive electrode 15 and is provided as output.

The heater 19 attached to the substrate 17 maintains the gas sensor at a predetermined temperature upon measurement. The diffusion control hole 13 controls inflow of hydrocarbon (measured species) which flows into the space 20.

The gas sensor of this embodiment can also be used in reducing atmosphere.

While a hydrocarbon sensor is described in this embodiment, an oxygen sensor can also be prepared by exchanging the position of the positive electrode 15 and the negative electrode 16 in FIG. 3. In short, the gas sensor of the present invention can be applied to not only hydrocarbon sensors but also oxygen sensors.

While typical embodiments of the electrochemical device of the present invention have been described above, the electrochemical device of the present invention encompasses various known electrochemical devices using a conventional ionic conductor. In other words, the ionic conductor of the present invention can be applied to various electrochemical devices.

In the following, the present invention is described in more detail by means of examples, but the present invention is not limited thereto. Specifically, the composition and the substitution element of the ionic conductor of the present invention are not limited to those in the following examples, and highly reliable ionic conductors of various compositions containing various substitution elements within the range satisfying the conditions can be obtained.

Further, while the ionic conductor of the present invention has been synthesized by solid-phase sintering in the following examples, the synthesis method is not limited thereto. The ionic conductor of the present invention can also be synthesized by, for example, coprecipitation, nitration or spray granulation. Further, for example, CVD, a sputter method and a thermal spraying method may be used. Neither is the form of the ionic conductor limited, and for example, the ionic conductor may be in the form of bulk or film.

EXAMPLES

Example 1

In this example, a perovskite oxide represented by the formula (2): $BaCe_xM^2{}_yL^2{}_zO_{3-\alpha}$ comprising Ba and Ce as basic components described in Embodiment 1 is described.

Of the ionic conductors of the present invention, samples containing P or B were synthesized by solid-state reaction. Raw material powder such as barium acetate and cerium oxide was each mixed with a predetermined amount of diammonium hydrogenphosphate or boron oxide, and the mixture was pulverized and mixed in a polypropylene pot using an ethanol solvent for three days. After mixing sufficiently, the solvent was evaporated, the mixture was degreased by electrothermal heating and then pulverized and mixed in the polyethylene pot again for three days. Subsequently, the pulverized mixture was press-formed into a cylindrical product and baked at 1000° C. for 12 hours. The resulting baked product was crushed into coarse particles and then pulverized into particles of 3 μm or less in a benzene solvent using a planetary ball mill. The resulting powder was vacuum dried at 150° C., then isostatically pressed at 2000 kgw/cm² to be formed into a cylindrical product, and a sintered product was synthesized by immediately baking the product at 1500° C. for 10 hours.

For samples containing N of the ionic conductors of the present invention, raw material powder such as barium acetate and cerium oxide was each introduced into a polyethylene pot and the mixture was pulverized and mixed using an ethanol solvent for three days. After mixing sufficiently, the solvent was evaporated, the mixture was degreased by electrothermal heating and then pulverized and mixed in the polyethylene pot again for three days. Subsequently, the resulting pulverized mixture was press-formed into a cylindrical product and baked at 1000° C. for 12 hours in nitrogen atmosphere. The resulting baked material was crushed into coarse particles and then pulverized into particles of 3 μm or less in a benzene solvent using a planetary ball mill. The resulting powder was vacuum dried at 150° C., then isostatically pressed at 2000 kgw/cm² to be formed into a cylindrical product, and a sintered product was synthesized by immediately baking the product at 1500° C. for 10 hours in nitrogen atmosphere. Subsequently, annealing was performed at a predetermined temperature for a predetermined time in air atmosphere to give a sintered product.

These sintered products were sufficiently dense and were single phase perovskite oxides which have a density of 96% or more of a calculated density.

[Evaluation Test]

The ionic conductors comprising a perovskite oxide prepared as described above were evaluated by the following methods.

(1) Moisture Resistance

To evaluate whether the ionic conductor obtained is stable in high humidity atmosphere or not, a disc-like sample having a diameter of 13 mm and a thickness of 500 μm was introduced into a constant temperature/humidity chamber of 85° C./85% and observed.

It is known that in the case of conventional BaCe ionic conductors, barium carbonate powder precipitates about 100 hours after leaving the conductor in a constant temperature/humidity chamber. This is because chemical change occurs in two steps; i.e., barium in an ionic conductor turns to barium hydroxide due to moisture in the air and then barium hydroxide turns to barium carbonate due to carbon dioxide in the air.

Accordingly, moisture resistance was evaluated based on the time for barium carbonate powder to precipitate on the sample (ionic conductor) surface, and the surface coverage of the fine powder was measured after 100 hours.

Herein, the surface coverage on one side of a sample was determined according to the formula: {(area where fine powder precipitated)/(surface area of sample)}×100(%). More specifically, after leaving a disc-like sample in a constant temperature/humidity chamber, photographs were taken by a digital camera. Then the surface coverage was calculated according to the formula from the photographic image obtained.

A surface coverage of 0% (no precipitation) was determined to be "Excellent" (1), 5% or less (little precipitation) to be "Good" (2) and 5% or more (much precipitation or breakage) to be "Poor" (3).

(2) Reduction Resistance

The materials determined to be "Excellent" (1) or "Good" (2) in the above moisture resistance test were evaluated for stability in reducing atmosphere. A disc-like sample having a diameter of 13 mm and a thickness of 500 μm was put into a tube furnace and heated to 1000° C., 900° C. or 800° C. in air atmosphere in 1 hour, and left in 5% hydrogen atmosphere diluted with argon for 5 hours. Subsequently, air atmosphere was again formed and the sample was cooled to room temperature.

It is generally known that an impurity layer formed on grain boundaries is a cause for generation of cracks in ceramics. Given this, if cracks are generated by giving thermal shock to the ionic conductor under the conditions, it can be assumed that an impurity layer has precipitated at grain boundaries due to degradation caused by hydrogen, in other words, reaction with hydrogen. This method is easier than an analytical method based on X-ray diffraction. All the ionic conductors have passed a 1000° C. heat resistance cycle test.

Change in the samples after the test was observed and samples without crack was evaluated "Good" (2) and those with crack was evaluated "Poor" (3).

Table 1 shows the results of the tests for moisture resistance and reduction resistance of conventional ionic conductors for comparison. Table 2 shows the results of the tests for moisture resistance and reduction resistance of the ionic conductor of the present Example 1.

Table 1 and Table 2 prove that the ionic conductor of the present invention is superior in moisture resistance and reduction resistance compared to ionic conductors of a conventional composition.

TABLE 1

Conventional ionic conductors for comparison

| sample | moisture resistance | reduction resistance | | |
|---|---|---|---|---|
| | | 1000° C. | 900° C. | 800° C. |
| $BaCe_{0.8}Pr_{0.2}O_{3-\alpha}$ | 3 | — | — | — |
| $BaCe_{0.8}Y_{0.2}O_{3-\alpha}$ | 3 | — | — | — |
| $BaCe_{0.8}Yb_{0.2}O_{3-\alpha}$ | 3 | — | — | — |
| $BaCe_{0.8}Gd_{0.2}O_{3-\alpha}$ | 3 | — | — | — |
| $BaCe_{0.8}In_{0.5}O_{3-\alpha}$ | 3 | — | — | — |
| $BaCe_{0.8}Nd_{0.2}O_{3-\alpha}$ | 3 | — | — | — |
| $BaCe_{0.8}Pm_{0.2}O_{3-\alpha}$ | 3 | — | — | — |
| $BaCe_{0.8}Sm_{0.2}O_{3-\alpha}$ | 3 | — | — | — |
| $BaCe_{0.8}Eu_{0.2}O_{3-\alpha}$ | 3 | — | — | — |

TABLE 1-continued

Conventional ionic conductors for comparison

| sample | moisture resistance | reduction resistance | | |
|---|---|---|---|---|
| | | 1000° C. | 900° C. | 800° C. |
| $BaCe_{0.8}Tb_{0.2}O_{3-\alpha}$ | 3 | — | — | — |
| $BaCe_{0.8}Dy_{0.2}O_{3-\alpha}$ | 3 | — | — | — |
| $BaCe_{0.8}Ho_{0.2}O_{3-\alpha}$ | 3 | — | — | — |
| $BaCe_{0.8}Er_{0.2}O_{3-\alpha}$ | 3 | — | — | — |
| $BaCe_{0.8}Tm_{0.2}O_{3-\alpha}$ | 3 | — | — | — |
| $BaCe_{0.8}La_{0.2}O_{3-\alpha}$ | 3 | — | — | — |

TABLE 2

Barium cerium ionic conductors

| sample | moisture resistance | reduction resistance | | |
|---|---|---|---|---|
| | | 1000° C. | 900° C. | 800° C. |
| $BaCe_{0.8}Pr_{0.2}P_{0.01}O_{3-\alpha}$ | 2 | 3 | 2 | 2 |
| $BaCe_{0.8}Pr_{0.2}P_{0.10}O_{3-\alpha}$ | 2 | 2 | 2 | 2 |
| $BaCe_{0.8}Yb_{0.2}P_{0.01}O_{3-\alpha}$ | 2 | 3 | 2 | 2 |
| $BaCe_{0.8}Yb_{0.2}P_{0.10}O_{3-\alpha}$ | 2 | 2 | 2 | 2 |
| $BaCe_{0.8}Y_{0.2}P_{0.01}O_{3-\alpha}$ | 2 | 3 | 2 | 2 |
| $BaCe_{0.8}Y_{0.2}P_{0.10}O_{3-\alpha}$ | 2 | 2 | 2 | 2 |
| $BaCe_{0.8}Gd_{0.2}P_{0.01}O_{3-\alpha}$ | 2 | 3 | 2 | 2 |
| $BaCe_{0.8}Gd_{0.2}P_{0.10}O_{3-\alpha}$ | 2 | 2 | 2 | 2 |
| $BaCe_{0.8}Pr_{0.2}B_{0.01}O_{3-\alpha}$ | 2 | 3 | 3 | 2 |
| $BaCe_{0.8}Pr_{0.2}B_{0.10}O_{3-\alpha}$ | 2 | 3 | 2 | 2 |
| $BaCe_{0.8}Yb_{0.2}B_{0.01}O_{3-\alpha}$ | 2 | 3 | 3 | 2 |
| $BaCe_{0.8}Yb_{0.2}B_{0.10}O_{3-\alpha}$ | 2 | 3 | 2 | 2 |
| $BaCe_{0.8}Y_{0.2}B_{0.01}O_{3-\alpha}$ | 2 | 3 | 3 | 2 |
| $BaCe_{0.8}Y_{0.2}B_{0.10}O_{3-\alpha}$ | 2 | 3 | 2 | 2 |
| $BaCe_{0.8}Gd_{0.2}B_{0.01}O_{3-\alpha}$ | 2 | 3 | 3 | 2 |
| $BaCe_{0.8}Gd_{0.2}B_{0.10}O_{3-\alpha}$ | 2 | 3 | 2 | 2 |
| $BaCe_{0.8}Pr_{0.2}N_{0.01}O_{3-\alpha}$ | 2 | 3 | 3 | 2 |
| $BaCe_{0.8}Pr_{0.2}N_{0.10}O_{3-\alpha}$ | 2 | 3 | 2 | 2 |
| $BaCe_{0.8}Yb_{0.2}N_{0.01}O_{3-\alpha}$ | 2 | 3 | 3 | 2 |
| $BaCe_{0.8}Yb_{0.2}N_{0.10}O_{3-\alpha}$ | 2 | 3 | 2 | 2 |
| $BaCe_{0.8}Y_{0.2}N_{0.01}O_{3-\alpha}$ | 2 | 3 | 3 | 2 |
| $BaCe_{0.8}Y_{0.2}N_{0.10}O_{3-\alpha}$ | 2 | 3 | 2 | 2 |
| $BaCe_{0.8}Gd_{0.2}N_{0.01}O_{3-\alpha}$ | 2 | 3 | 3 | 2 |
| $BaCe_{0.8}Gd_{0.2}N_{0.10}O_{3-\alpha}$ | 2 | 3 | 2 | 2 |

Example 2

In this Example 2, a perovskite oxide represented by the formula (1): $BaZr_aCe_bM^1_cL^1_dO_{3-\alpha}$ comprising Ba, Zr and Ce as basic components described in Embodiment 2 is described.

Of the ionic conductors of the present invention, samples containing P or B were synthesized by solid-state reaction. Raw material powder such as barium acetate, zirconium hydroxide and cerium oxide was each mixed with a predetermined amount of diammonium hydrogenphosphate or boron oxide, and the mixture was introduced into a polyethylene pot and pulverized and mixed using an ethanol solvent for three days. After mixing sufficiently, the solvent was evaporated, the mixture was degreased by electrothermal heating and then pulverized and mixed in the polyethylene pot again for three days. Subsequently, the resulting pulverized mixture was press-formed into a cylindrical product and baked at 1000° C. for 12 hours. The resulting baked material was crushed into coarse particles and then pulverized into particles of 3 μm or less in a benzene solvent using a planetary ball mill. The resulting powder was vacuum dried at 150° C., then isostatically pressed at 2000 kgw/cm² to be formed into a cylindrical product, and a sintered product was synthesized by immediately baking the product at 1500° C. for 10 hours.

For samples containing N of the ionic conductors of the present invention, raw material powder such as barium acetate, zirconium hydroxide and cerium oxide was each introduced into a polyethylene pot and the mixture was pulverized and mixed using an ethanol solvent for three days. After mixing sufficiently, the solvent was evaporated, the mixture was degreased by electrothermal heating and then pulverized and mixed in the polyethylene pot again for three days. Subsequently, the resulting pulverized mixture was press-formed into a cylindrical product and baked at 1000° C. for 12 hours in nitrogen atmosphere. The resulting baked material was crushed into coarse particles and then pulverized into particles of 3 μm or less in a benzene solvent using a planetary ball mill. The resulting powder was vacuum dried at 150° C., then isostatically pressed at 2000 kgw/cm² to be formed into a cylindrical product, and a sintered product was synthesized by immediately baking the product at 1500° C. for 10 hours in nitrogen atmosphere. Subsequently, annealing was performed at a predetermined temperature for a predetermined time in air atmosphere to give a sintered product.

These sintered products were sufficiently dense and were single phase perovskite oxides which have a density of 96% or more of a calculated density.

The moisture resistance and the reduction resistance of various ionic conductors thus obtained were evaluated in the same manner as in Example 1.

Table 3 shows the results of the tests for moisture resistance and reduction resistance of conventional ionic conductors for comparison. Table 4 shows the results of the tests for moisture resistance and reduction resistance of the ionic conductor of the present Example. Table 3 and Table 4 prove that the ionic conductor of the present invention is superior in moisture resistance and reduction resistance compared to ionic conductors of a conventional composition. The results show that $BaZr_{0.4}Ce_{0.4}Gd_{0.2}P_{0.1}O_{3-\alpha}$, $BaZr_{0.4}Ce_{0.4}Gd_{0.2}P_{0.1}O_{3-\alpha}$, $BaZr_{0.4}Ce_{0.4}In_{0.2}P_{0.01}O_{3-\alpha}$, and $BaZr_{0.4}Ce_{0.4}In_{0.2}P_{0.1}O_{3-\alpha}$ are particularly preferred.

TABLE 3

Conventional ionic conductors for comparison

| sample | moisture resistance | reduction resistance 1000° C. | 900° C. | 800° C. |
|---|---|---|---|---|
| $BaZr_{0.4}Ce_{0.4}Pr_{0.2}O_{3-\alpha}$ | 3 | — | — | — |
| $BaZr_{0.4}Ce_{0.4}Yb_{0.2}O_{3-\alpha}$ | 3 | — | — | — |
| $BaZr_{0.4}Ce_{0.4}Y_{0.2}O_{3-\alpha}$ | 3 | — | — | — |
| $BaZr_{0.4}Ce_{0.4}Gd_{0.2}O_{3-\alpha}$ | 2 | 3 | 3 | 2 |
| $BaZr_{0.4}Ce_{0.4}In_{0.2}O_{3-\alpha}$ | 1 | 3 | 2 | 2 |

TABLE 4

Barium zirconium cerium ionic conductors

| sample | moisture resistance | reduction resistance 1000° C. | 900° C. | 800° C. |
|---|---|---|---|---|
| $BaZr_{0.4}Ce_{0.4}Pr_{0.2}P_{0.01}O_{3-\alpha}$ | 2 | 3 | 3 | 2 |
| $BaZr_{0.4}Ce_{0.4}Pr_{0.2}P_{0.1}O_{3-\alpha}$ | 2 | 3 | 3 | 2 |
| $BaZr_{0.4}Ce_{0.4}Yb_{0.2}P_{0.01}O_{3-\alpha}$ | 2 | 3 | 3 | 2 |
| $BaZr_{0.4}Ce_{0.4}Yb_{0.2}P_{0.1}O_{3-\alpha}$ | 2 | 3 | 3 | 2 |
| $BaZr_{0.4}Ce_{0.4}Y_{0.2}P_{0.01}O_{3-\alpha}$ | 2 | 3 | 3 | 2 |
| $BaZr_{0.4}Ce_{0.4}Y_{0.2}P_{0.1}O_{3-\alpha}$ | 2 | 3 | 3 | 2 |
| $BaZr_{0.4}Ce_{0.4}Gd_{0.2}P_{0.01}O_{3-\alpha}$ | 2 | 3 | 2 | 2 |
| $BaZr_{0.4}Ce_{0.4}Gd_{0.2}P_{0.1}O_{3-\alpha}$ | 1 | 3 | 2 | 2 |
| $BaZr_{0.4}Ce_{0.4}In_{0.2}P_{0.01}O_{3-\alpha}$ | 1 | 2 | 2 | 2 |
| $BaZr_{0.4}Ce_{0.4}In_{0.2}P_{0.1}O_{3-\alpha}$ | 1 | 2 | 2 | 2 |

TABLE 4-continued

Barium zirconium cerium ionic conductors

| sample | moisture resistance | reduction resistance 1000° C. | 900° C. | 800° C. |
|---|---|---|---|---|
| $BaZr_{0.4}Ce_{0.4}Pr_{0.2}B_{0.01}O_{3-\alpha}$ | 2 | 3 | 3 | 2 |
| $BaZr_{0.4}Ce_{0.4}Pr_{0.2}B_{0.1}O_{3-\alpha}$ | 2 | 3 | 3 | 2 |
| $BaZr_{0.4}Ce_{0.4}Yb_{0.2}B_{0.01}O_{3-\alpha}$ | 2 | 3 | 3 | 2 |
| $BaZr_{0.4}Ce_{0.4}Yb_{0.2}B_{0.1}O_{3-\alpha}$ | 2 | 3 | 3 | 2 |
| $BaZr_{0.4}Ce_{0.4}Y_{0.2}B_{0.01}O_{3-\alpha}$ | 2 | 3 | 3 | 2 |
| $BaZr_{0.4}Ce_{0.4}Y_{0.2}B_{0.1}O_{3-\alpha}$ | 2 | 3 | 3 | 2 |
| $BaZr_{0.4}Ce_{0.4}Gd_{0.2}B_{0.01}O_{3-\alpha}$ | 2 | 3 | 2 | 2 |
| $BaZr_{0.4}Ce_{0.4}Gd_{0.2}B_{0.1}O_{3-\alpha}$ | 1 | 3 | 2 | 2 |
| $BaZr_{0.4}Ce_{0.4}In_{0.2}B_{0.01}O_{3-\alpha}$ | 1 | 2 | 2 | 2 |
| $BaZr_{0.4}Ce_{0.4}In_{0.2}B_{0.1}O_{3-\alpha}$ | 1 | 2 | 2 | 2 |
| $BaZr_{0.4}Ce_{0.4}Pr_{0.2}N_{0.01}O_{3-\alpha}$ | 2 | 3 | 3 | 2 |
| $BaZr_{0.4}Ce_{0.4}Pr_{0.2}N_{0.1}O_{3-\alpha}$ | 2 | 3 | 3 | 2 |
| $BaZr_{0.4}Ce_{0.4}Yb_{0.2}N_{0.01}O_{3-\alpha}$ | 2 | 3 | 3 | 2 |
| $BaZr_{0.4}Ce_{0.4}Yb_{0.2}N_{0.1}O_{3-\alpha}$ | 2 | 3 | 3 | 2 |
| $BaZr_{0.4}Ce_{0.4}Y_{0.2}N_{0.01}O_{3-\alpha}$ | 2 | 3 | 3 | 2 |
| $BaZr_{0.4}Ce_{0.4}Y_{0.2}N_{0.1}O_{3-\alpha}$ | 2 | 3 | 3 | 2 |
| $BaZr_{0.4}Ce_{0.4}Gd_{0.2}N_{0.01}O_{3-\alpha}$ | 2 | 3 | 2 | 2 |
| $BaZr_{0.4}Ce_{0.4}Gd_{0.2}N_{0.1}O_{3-\alpha}$ | 1 | 3 | 2 | 2 |
| $BaZr_{0.4}Ce_{0.4}In_{0.2}N_{0.01}O_{3-\alpha}$ | 1 | 2 | 2 | 2 |
| $BaZr_{0.4}Ce_{0.4}In_{0.2}N_{0.1}O_{3-\alpha}$ | 1 | 2 | 2 | 2 |

Example 3

In this Example 3, a perovskite oxide represented by the formula (3): $BaCe_eIn_fL^3_gO_{3-\alpha}$ comprising Ba, Ce and In as basic components described in Embodiment 3 is described.

Of the ionic conductors of the present invention, samples containing P or B were synthesized by solid-state reaction. Raw material powder such as barium acetate, cerium oxide and indium oxide was each mixed with a predetermined amount of diammonium hydrogenphosphate or boron oxide, and the mixture was pulverized and mixed in a polyethylene pot using an ethanol solvent for three days. After mixing sufficiently, the solvent was evaporated, the mixture was degreased by electrothermal heating and then pulverized and mixed in the polyethylene pot again for three days. Subsequently, the resulting pulverized mixture was press-formed into a cylindrical product and baked at 1000° C. for 12 hours. The resulting baked material was crushed into coarse particles and then pulverized into particles of 3 μm or less in a benzene solvent using a planetary ball mill. The resulting powder was vacuum dried at 150° C., then isostatically pressed at 2000 kgw/cm² to be formed into a cylindrical product, and a sintered product was synthesized by immediately baking the product at 1500° C. for 10 hours.

For samples containing N of the ionic conductors of the present invention, raw material powder such as barium acetate, cerium oxide and indium oxide was each introduced into a polyethylene pot and the mixture was pulverized and mixed using an ethanol solvent for three days. After mixing sufficiently, the solvent was evaporated, the mixture was degreased by electrothermal heating and then pulverized and mixed in the polyethylene pot again for three days. Subsequently, the resulting pulverized mixture was press-formed into a cylindrical product and baked at 1000° C. for 12 hours in nitrogen atmosphere. The resulting baked material was crushed into coarse particles and then pulverized into particles of 3 μm or less in a benzene solvent using a planetary ball mill. The resulting powder was vacuum dried at 150° C., then isostatically pressed at 2000 kgw/cm² to be formed into a cylindrical product, and a sintered product was synthesized by immediately baking the product at 1500° C. for 10 hours in nitrogen atmosphere. Subsequently, annealing was performed at a predetermined temperature for a predetermined time in air atmosphere to give a sintered product.

These sintered products were sufficiently dense and were single phase perovskite oxides which have a density of 96% or more of a calculated density.

The moisture resistance and the reduction resistance of various ionic conductors thus obtained were evaluated in the same manner as in Example 1.

Table 5 shows the results of the tests for moisture resistance and reduction resistance of conventional ionic conductors for comparison. Table 6 shows the results of the tests for moisture resistance and reduction resistance of the ionic conductor of the present Example. Table 5 and Table 6 prove that the ionic conductor of the present invention is superior in moisture resistance and reduction resistance compared to ionic conductors of a conventional composition.

TABLE 5

Conventional ionic conductors for comparison

| sample | moisture resistance | reduction resistance | | |
|---|---|---|---|---|
| | | 1000° C. | 900° C. | 800° C. |
| $BaCe_{0.48}In_{0.48}O_{3-\alpha}$ | 3 | — | — | — |
| $BaCe_{0.50}In_{0.50}O_{3-\alpha}$ | 3 | — | — | — |
| $BaCe_{0.52}In_{0.52}O_{3-\alpha}$ | 3 | — | — | — |
| $BaCe_{0.55}In_{0.55}O_{3-\alpha}$ | 3 | — | — | — |
| $BaCe_{0.60}In_{0.60}O_{3-\alpha}$ | 3 | — | — | — |

TABLE 6

Barium cerium Indium ionic conductors

| sample | moisture resistance | reduction resistance | | |
|---|---|---|---|---|
| | | 1000° C. | 900° C. | 800° C. |
| $BaCe_{0.48}In_{0.48}P_{0.01}O_{3-\alpha}$ | 3 | — | — | — |
| $BaCe_{0.48}In_{0.48}P_{0.1}O_{3-\alpha}$ | 2 | 3 | 3 | 2 |
| $BaCe_{0.50}In_{0.50}P_{0.01}O_{3-\alpha}$ | 3 | — | — | — |
| $BaCe_{0.50}In_{0.50}P_{0.1}O_{3-\alpha}$ | 2 | 3 | 3 | 2 |
| $BaCe_{0.52}In_{0.52}P_{0.01}O_{3-\alpha}$ | 1 | 3 | 2 | 2 |
| $BaCe_{0.52}In_{0.52}P_{0.1}O_{3-\alpha}$ | 1 | 3 | 2 | 2 |
| $BaCe_{0.55}In_{0.55}P_{0.01}O_{3-\alpha}$ | 1 | 3 | 2 | 2 |
| $BaCe_{0.55}In_{0.55}P_{0.1}O_{3-\alpha}$ | 1 | 2 | 2 | 2 |
| $BaCe_{0.60}In_{0.60}P_{0.01}O_{3-\alpha}$ | 1 | 3 | 2 | 2 |
| $BaCe_{0.60}In_{0.60}P_{0.1}O_{3-\alpha}$ | 1 | 2 | 2 | 2 |
| $BaCe_{0.48}In_{0.48}B_{0.01}O_{3-\alpha}$ | 3 | — | — | — |
| $BaCe_{0.48}In_{0.48}B_{0.1}O_{3-\alpha}$ | 2 | 3 | 3 | 2 |
| $BaCe_{0.50}In_{0.50}B_{0.01}O_{3-\alpha}$ | 3 | — | — | — |
| $BaCe_{0.50}In_{0.50}B_{0.1}O_{3-\alpha}$ | 2 | 3 | 3 | 2 |
| $BaCe_{0.52}In_{0.52}B_{0.01}O_{3-\alpha}$ | 1 | 3 | 2 | 2 |
| $BaCe_{0.52}In_{0.52}B_{0.1}O_{3-\alpha}$ | 1 | 3 | 2 | 2 |
| $BaCe_{0.55}In_{0.55}B_{0.01}O_{3-\alpha}$ | 1 | 3 | 2 | 2 |
| $BaCe_{0.55}In_{0.55}B_{0.1}O_{3-\alpha}$ | 1 | 3 | 2 | 2 |
| $BaCe_{0.60}In_{0.60}B_{0.01}O_{3-\alpha}$ | 1 | 3 | 2 | 2 |
| $BaCe_{0.60}In_{0.60}B_{0.1}O_{3-\alpha}$ | 1 | 3 | 2 | 2 |
| $BaCe_{0.48}In_{0.48}N_{0.01}O_{3-\alpha}$ | 3 | — | — | — |
| $BaCe_{0.48}In_{0.48}N_{0.1}O_{3-\alpha}$ | 2 | 3 | 3 | 2 |
| $BaCe_{0.50}In_{0.50}N_{0.01}O_{3-\alpha}$ | 3 | — | — | — |
| $BaCe_{0.50}In_{0.50}N_{0.1}O_{3-\alpha}$ | 2 | 3 | 3 | 2 |
| $BaCe_{0.52}In_{0.52}N_{0.01}O_{3-\alpha}$ | 1 | 3 | 2 | 2 |
| $BaCe_{0.52}In_{0.52}N_{0.1}O_{3-\alpha}$ | 1 | 3 | 2 | 2 |
| $BaCe_{0.55}In_{0.55}N_{0.01}O_{3-\alpha}$ | 1 | 3 | 2 | 2 |
| $BaCe_{0.55}In_{0.55}N_{0.1}O_{3-\alpha}$ | 1 | 3 | 2 | 2 |
| $BaCe_{0.60}In_{0.60}N_{0.01}O_{3-\alpha}$ | 1 | 3 | 2 | 2 |
| $BaCe_{0.60}In_{0.60}N_{0.1}O_{3-\alpha}$ | 1 | 3 | 2 | 2 |

(3) Conductivity

Further, for measurement of conductivity, a cubic sample of 4×4×4 mm was prepared. Platinum paste was applied to both end faces of the sample and the sample was baked. The resistance value was calculated by a four probes AC impedance method in the air to determine conductivity.

This made it possible to remove conductor resistance and estimate only the bulk resistance of the sample. Five kinds of samples of $BaCe_{0.48}In_{0.48}P_xO_{3-\alpha}$, $BaCe_{0.50}In_{0.50}P_xO_{3-\alpha}$, $BaCe_{0.52}In_{0.52}P_xO_{3-\alpha}$, $BaCe_{0.55}In_{0.55}P_xO_{3-\alpha}$ and $BaCe_{0.60}In_{0.60}P_xO_{3-\alpha}$ were prepared. P was added in an amount (value of X) of 0, 0.01, 0.10 or 0.20.

The correlation between the amount added of P and the conductivity is shown in FIG. 1.

As is evident from the evaluation results shown in FIG. 1, the ionic conductor of the present invention is excellent in moisture resistance and in particular, has greatly improved reduction resistance. Further, a perovskite oxide represented by the formula (3): $BaCe_eIn_fL^3_gO_{3-\alpha}$ comprising Ba, Ce and In as basic components described in Embodiment 3 has practical electric conductance.

However, as seen from the result of the cases in which 0.10 or more of P is added, excess additives result in decrease in conductivity. Accordingly, it is preferred that P is added to Ba in an amount of at most 0.10 when the amount of Ba is taken as 1.

INDUSTRIAL APPLICABILITY

The ionic conductor according to the present invention has high ionic conductivity, excellent moisture resistance and reduction resistance, and can be suitably applied to high performance and highly reliable electrochemical devices such as gas sensors and fuel cells.

The invention claimed is:

1. An ionic conductor comprising a perovskite oxide represented by the formula (1):

$$BaZr_aCe_bM^1_cL^1_dO_{3-\alpha} \quad (1)$$

(wherein $M^1$ is at least one element selected from the group consisting of rare earth elements, In, Mn, Fe, Co, Ni, Al and Ga, $L^1$ is at least one element selected from the group consisting of P, B and N and a, b, c, d and α satisfy $0 \leq a < 1.2$, $0 < b < 1.2$, $0 < c < 1.2$, $0.9 < a+b+c < 1.2$, $0 < d < 0.1$ and $0 < \alpha < 3$).

2. The ionic conductor according to claim 1, wherein said $M^1$ is at least one element selected from the group consisting of Pr, Y, Yb, Gd and In.

3. The ionic conductor according to claim 1, wherein a=0 is satisfied.

4. The ionic conductor according to claim 1, wherein a=0 is satisfied and said $M^1$ is In.

5. The ionic conductor according to claim 4, wherein $1 \leq b+c < 1.2$ is satisfied.

6. The ionic conductor according to claim 4, wherein said $L^1$ is P.

7. An electrochemical device comprising the ionic conductor according to claim 1 as a solid electrolyte.

8. A fuel cell comprising the electrochemical device according to claim 7.

* * * * *

UNITED STATES PATENT AND TRADEMARK OFFICE
CERTIFICATE OF CORRECTION

PATENT NO. : 7,625,653 B2
APPLICATION NO. : 11/884388
DATED : December 1, 2009
INVENTOR(S) : Tomohiro Kuroha et al.

It is certified that error appears in the above-identified patent and that said Letters Patent is hereby corrected as shown below:

Title page,
In Item "(86) PCT No.:" please change
"PCT/JP2006/004900"
to
--PCT/JP2006/304900--.

Title page,
In Item "(57) Abstract" in line 9, please change
"...a, b, c, d and a satisfy..."
to
--...a, b, c, d and $\alpha$ satisfy...--.

Signed and Sealed this

Twenty-fifth Day of May, 2010

David J. Kappos
*Director of the United States Patent and Trademark Office*